No. 610,966. Patented Sept. 20, 1898.
J. HEIMANN.
MEANS FOR INFLATING PNEUMATIC TIRES.
(Application filed July 16, 1898.)
(No Model.)
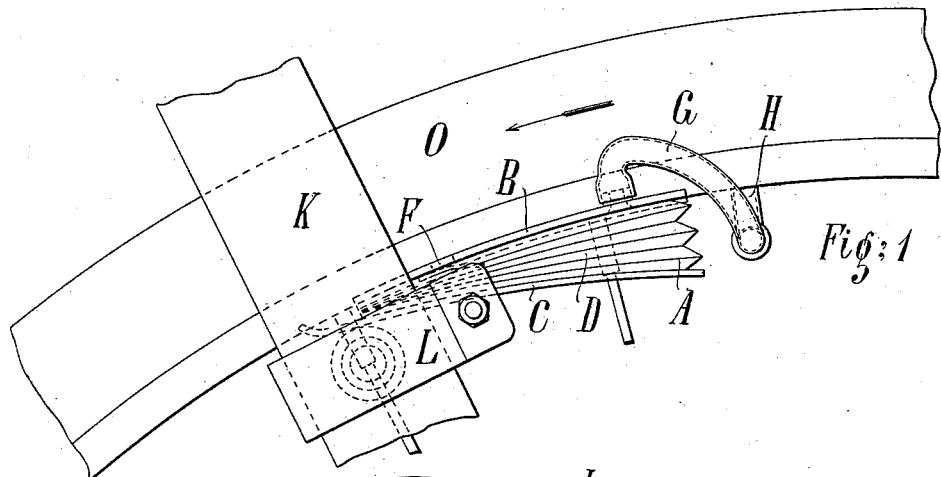
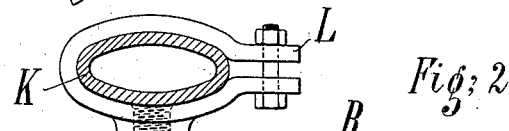
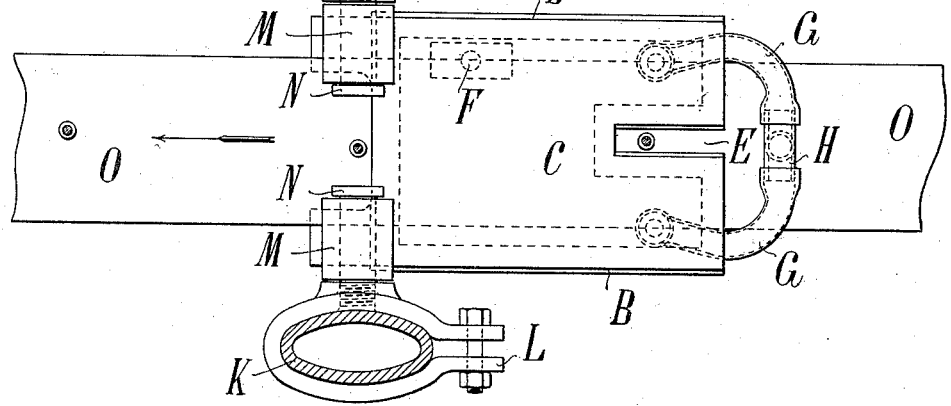
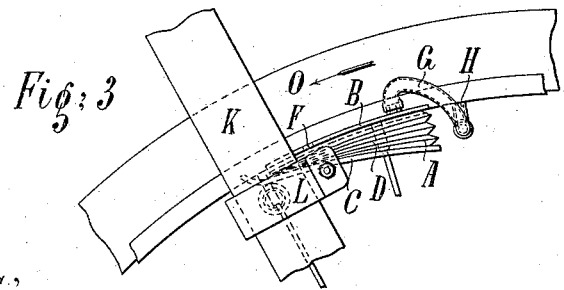
Witnesses:
William H. Madden
Inventor:
Joh. Heimann

UNITED STATES PATENT OFFICE.

JOHANN HEIMANN, OF COLOGNE-BAYENTHAL, GERMANY.

MEANS FOR INFLATING PNEUMATIC TIRES.

SPECIFICATION forming part of Letters Patent No. 610,966, dated September 20, 1898.

Application filed July 16, 1898. Serial No. 686,116. (No model.)

*To all whom it may concern:*

Be it known that I, JOHANN HEIMANN, a subject of the Emperor of Germany, residing at Cologne-Bayenthal, in the Province of Rhenish Prussia, Germany, have invented certain new and useful Improvements in Means for Inflating Pneumatic Tires for Bicycles Automatically; and I do hereby declare the following to be a full, clear, and exact description of the invention, such as will enable others skilled in the art to which it appertains to make and use the same.

My invention relates to improved means for inflating pneumatic tires for bicycles automatically while the wheel is in use in order to refill new air into the tire when in consequence of any untightness air has escaped, and thus my object is always to keep the tire inflated.

It consists in the arrangement of bellows at the inner circumference of the tire, with suitable valves and pipe connections between the bellows and the inside of the tire, and of depressing-rollers fixed to any convenient part of the frame of the bicycle, so that the bellows must go past the rollers and will thereby be compressed and drive out the air into the tire and open again automatically immediately afterward for a new filling.

On the accompanying drawings, Figure 1 is a side view of the arrangement. Fig. 2 is a plan seen from the inside of a tire. Fig. 3 is a similar view as Fig. 1 on a small scale.

The bellows A are arranged upon a plate B, fixed to the inner side of the tire O. They are of wedge shape, the plate B forming their bottom. A plate C, hinged to the plate B, forms the movable cover of the bellows. Both plates are connected by folded sides D. In order to obtain a larger capacity, the bellows are made with a slit E at one end, so as to allow the spoke of the wheel to pass through. An opening F (indicated in dotted lines in Fig. 2) allows the admittance of air into the bellows. It is closed by a valve opening inward, while tubes G, leading from each of the forked ends of the bellows and which are connected to a common T-piece H, lead into the interior of the tire.

To the double stays K or any other suitable part of the frame of the bicycle are fixed in brackets L the rollers M, turning on pins N in such a manner that when the respective part of the rim of the tire with the bellows thereon passes along these rollers they will depress the bellows and so drive out the air through the pipes G and H into the tire O. The bellows then open again automatically and air enters into them by the valve F. The brackets L are adjustable upon the stays K, so that the rollers M can be brought nearer to or farther away from the bellows in order to change the efficiency of these or to set them out of work altogether.

From the description and the drawings it will be understood that at every revolution of the wheel the bellows must pass the rollers M, which then act upon the covering-plate C, pressing it down and so forcing the air into the tire, and this therefore will always be inflated.

The shape of the bellows secures an easy passage of the same below the rollers without a shock or sudden pressure.

I am aware that automatic inflating devices have been in use before my invention. Most of them are arranged inside of the tire and difficult to repair. My arrangement has the great advantage of being easily detachable and conveniently accessible for repair and inspection.

Having now described and explained my invention, I declare that what I claim, and desire to secure by Letters Patent, is—

In pneumatic tires for bicycles the combination of a plate B fixed to the inside of the tire, a hinged plate C both being connected by folded sides D to form wedge-shaped bellows, tubes G and H leading from the bellows to the interior of the tire with rollers M on pins N of brackets L, the latter being fixed adjustably to stays K of the frame of the bicycle, the whole as described and illustrated and for the purpose set forth.

In testimony whereof I have affixed my signature in presence of two witnesses.

JOH. HEIMANN.

Witnesses:
WILLIAM H. MADDEN,
GERTRUD STENZ.